US008931065B2

(12) United States Patent
Luo

(10) Patent No.: US 8,931,065 B2
(45) Date of Patent: Jan. 6, 2015

(54) OTA BOOTSTRAP METHOD AND SYSTEM

(75) Inventor: Hong Luo, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 11 days.

(21) Appl. No.: 13/818,623

(22) PCT Filed: Oct. 18, 2010

(86) PCT No.: PCT/CN2010/077842
§ 371 (c)(1),
(2), (4) Date: Feb. 22, 2013

(87) PCT Pub. No.: WO2012/024851
PCT Pub. Date: Mar. 1, 2012

(65) Prior Publication Data
US 2013/0160094 A1 Jun. 20, 2013

(30) Foreign Application Priority Data
Aug. 23, 2010 (CN) .......................... 2010 1 0261076

(51) Int. Cl.
| H04L 29/06 | (2006.01) |
|---|---|
| G06F 21/62 | (2013.01) |
| H04W 12/12 | (2009.01) |
| H04L 12/24 | (2006.01) |
| G06F 7/04 | (2006.01) |
| G06F 15/16 | (2006.01) |
| G06F 17/30 | (2006.01) |
| H04W 8/26 | (2009.01) |
| H04W 76/06 | (2009.01) |

(52) U.S. Cl.
CPC ........... G06F 21/6218 (2013.01); H04W 12/12 (2013.01); H04L 41/28 (2013.01); H04L 41/0809 (2013.01); H04W 8/26 (2013.01); H04W 76/06 (2013.01)

USPC ................... 726/4; 726/6; 713/168; 709/220; 709/223; 709/228

(58) Field of Classification Search
CPC .... G06F 21/6218; H04W 12/12; H04W 8/26; H04W 76/06; H04L 41/28; H04L 41/0809
USPC ............................................................ 726/4
See application file for complete search history.

(56) References Cited

U.S. PATENT DOCUMENTS

| 6,144,849 A | 11/2000 | Nodoushani | |
|---|---|---|---|
| 7,925,247 B2 * | 4/2011 | Rao | ............................... 455/418 |

(Continued)

FOREIGN PATENT DOCUMENTS

| CN | 1953394 A | 4/2007 |
|---|---|---|
| CN | 101188839 A | 5/2008 |
| CN | 101651682 A | 2/2010 |

OTHER PUBLICATIONS

P.R. China, State Intellectual Property Office, International Search Report for International Application No. PCT/CN2010/077842, mailed Jun. 2, 2011.

Primary Examiner — Shin-Hon Chen
(74) Attorney, Agent, or Firm — Bright IP Law Offices

(57) ABSTRACT

An over-the-air (OTA) bootstrap method and system are described, including: when a connection between a user-registered terminal device and a device management (DM) server is finished, the terminal device sends a bootstrap confirmation message to a service center corresponding to port information of a valid service center pre-stored in the terminal device; the service center analyzes the bootstrap confirmation message to determine a device ID of the terminal device, connects with a DM server authorized by the service center, and searches for an OTA bootstrap record corresponding to the device ID in a database of the authorized DM server; if the service center fails to find the corresponding OTA bootstrap record in the database of the authorized DM server, the service center notifies the user that the terminal device has performed an OTA bootstrap with an unauthorized DM server. The present invention can improve the security of the OTA bootstrap.

16 Claims, 4 Drawing Sheets

(56) References Cited

U.S. PATENT DOCUMENTS

| | | | |
|---|---|---|---|
| 8,117,293 B1* | 2/2012 | Anderson | 709/223 |
| 8,260,885 B2* | 9/2012 | Lindstrom | 709/220 |
| 8,370,491 B1* | 2/2013 | Breau et al. | 709/226 |
| 8,438,616 B2* | 5/2013 | Chai et al. | 726/4 |
| 8,621,582 B2* | 12/2013 | Boman et al. | 726/6 |
| 2005/0055397 A1* | 3/2005 | Zhu et al. | 709/200 |
| 2006/0143179 A1* | 6/2006 | Draluk et al. | 707/9 |
| 2007/0093243 A1* | 4/2007 | Kapadekar et al. | 455/419 |
| 2008/0072043 A1* | 3/2008 | Lee | 713/168 |
| 2008/0126555 A1* | 5/2008 | Rao | 709/230 |
| 2008/0155071 A1* | 6/2008 | Lindstrom | 709/220 |
| 2009/0019167 A1* | 1/2009 | Taaghol | 709/228 |
| 2011/0173685 A1* | 7/2011 | Chai et al. | 726/6 |
| 2011/0296181 A1* | 12/2011 | Barriga et al. | 713/168 |
| 2012/0030741 A1* | 2/2012 | Chai et al. | 726/6 |

* cited by examiner

OTA BOOTSTRAP METHOD AND SYSTEM

CROSS REFERENCE TO RELATED APPLICATIONS

This application is the U.S. National Stage of International Patent Application No. PCT/CN2010/077842 filed on Oct. 18, 2010, which claims priority to Chinese Patent Application No. 201010261076.1 filed on Aug. 23, 2010. Both the PCT Application and Chinese Application are hereby incorporated by reference in their entirety.

FIELD OF THE INVENTION

The present invention relates to an Open Mobile Alliance Device Management (OMA DM) technology and more particularly to an over-the-air (OTA) bootstrap method and system.

BACKGROUND OF THE INVENTION

With the development of mobile communication services, OMA DM becomes more and more important in the whole mobile operation server system, with its application improving network environment and lowering maintenance cost.

In an OMA DM protocol, a terminal having no DM function may gain, through a bootstrap, a capability of performing a DM with a server. The common three bootstraps are as follows:

1: Factory bootstrap (also called Customized bootstrap): all the information for a DM interaction is pre-produced in a terminal device when the terminal device is out of factory, needing no transmission of high-sensitivity information such as public key over the air, this Factory bootstrap has high security but low flexibility and is not applicable to all Original Equipment Manufacturers (OEM).

2: OTA bootstrap (also called Server initiated bootstrap): a terminal device having no DM function receives a bootstrap message from a DM server through a Wireless Application Protocol (WAP) Push or an Object Exchange (OBEX), and performs a bootstrap operation according to the content contained in the bootstrap message to gain a capability of having a DM session with the DM server, although having a capability of enabling a DM server to perform bootstrap for a terminal device for multiple times anytime anywhere based on needs, this highly-flexible OTA bootstrap method must transmit a great amount of sensitive information over the air and therefore takes a risk of receiving malicious bootstrap messages, so this OTA bootstrap method is not very secure.

3: Smartcard bootstrap: a terminal device reads information from an inserted smartcard to perform a bootstrap operation to gain a DM interaction capability, this method has high security but has increased cost as an inserted smartcard is required.

It can be seen from the analysis above that OTA bootstrap is the most flexible and efficient bootstrap method that can be applied to a network environment involving a terminal device, a user, a network server and a DM server, and the specific processing flow of an OTA bootstrap can be understood with reference to FIG. 1 in which the following steps are shown:

Step 101: a user registers in a terminal device;

Step 102: a network server detects the terminal device in the same network;

Step 103: determine whether or not the terminal device is registered in the current network (that is, whether or not the terminal device is usable);

Step S104: the network server sends an OTA bootstrap request to a DM server;

Step 105: the DM server feeds back a PUSH OTA bootstrap message;

Step 106: the terminal device performs an OTA bootstrap operation;

Step 107: the terminal device connects with the DM server to start a DM session with the latter.

In the flow shown in FIG. 1, the DM server may be an authorized DM server or an unauthorized one, that is, the terminal device may connect with an unauthorized DM server to leak DM management information to the unauthorized DM server, which will causes a big potential security hazard.

Therefore, although being flexible and efficient, OAT bootstrap is not used widely due to its potential security hazard. Although OMA DM protocol requires a Message Authentication Code (MAC) authentication for an OTA bootstrap and formulates a plurality of security mechanisms, for example, NETWPIN, USERPIN and USERNETWPIN, for the authentication, but is still incapable of preventing sensitive information (e.g. public key) from being cracked or leaked, for instance, after receiving an authenticated malicious bootstrap message and performing a bootstrap operation, a terminal device will be unable to perform normal function, or perform a DM interaction with an unauthorized DM server resulting in an authorized DM server losing the control over the terminal device without realizing it, and as a consequence, the DM management information of the terminal device will be leaked or modified maliciously, which will lead to a huge loss to the user.

SUMMARY OF THE INVENTION

The main object of the present invention is to provide an OTA bootstrap method to at least address the problem that the conventional OTA bootstrap has a risk of receiving malicious bootstrap messages and leaking DM management information to an unauthorized DM server and is therefore not very secure.

In accordance with an aspect of the present invention, there is provided an OTA bootstrap method, which comprises:

after completing a connection with a DM server, a user-registered terminal device sending a bootstrap confirmation message to a service center corresponding to port information of a valid service center pre-stored in the terminal device;

the service center analyzing the bootstrap confirmation message to determine a device ID of the terminal device, connecting to a DM server authorized by the service center, and searching a database of the authorized DM server for an OTA bootstrap record corresponding to the device ID; and if no corresponding OTA bootstrap record is found in the database of the authorized DM server, the service center notifying the user that the terminal device performed an OTA bootstrap with an unauthorized DM server.

According to another aspect of the present invention, there is provided an OTA bootstrap system, which comprises a terminal device, a service center corresponding to port information of a valid service center pre-stored in the terminal device, a DM server authorized by the service center, and a DM server connected with the terminal device.

The terminal device is configured to receive registration of a user and send a bootstrap confirmation message to the service center after completing a connection with the DM server.

The service center is configured to analyze the bootstrap confirmation message to determine a device ID of the terminal device, connect to the authorized DM server, search a database of the authorized DM server for an OTA bootstrap record corresponding to the device ID, and notify the user that the terminal device performed an OTA bootstrap with an unauthorized DM server if no corresponding OTA bootstrap is found in the database.

The authorized DM server is configured to store an OTA bootstrap record.

The DM server is configured to be connected with the terminal device.

In accordance with the embodiment above, after completing a connection with a DM server, a user-registered terminal device sends a bootstrap confirmation message to a service center corresponding to port information of a valid service center pre-stored in the terminal device. The service center analyzes the bootstrap confirmation message to determine a device ID of the terminal device, connects to a DM server authorized by the service center, and searches a database of the authorized DM server for an OTA bootstrap record corresponding to the device ID, and notifies the user that the terminal device performed an OTA bootstrap with an unauthorized DM server if no corresponding OTA bootstrap is found in the database. By using the method provided herein, an OTA bootstrap performed between a terminal device and an unauthorized DM server can be found timely after a connection is completed, thereby solving the problem associated with the conventional OTA bootstrap that has a risk of receiving malicious bootstrap messages and leaking DM management information to an unauthorized DM server and is therefore not very secure, thus, the user is protected against a great loss as an authorized DM server is prevented from unconsciously losing the control over a terminal device, and the security of OTA bootstrap is improved.

The accompanying drawings illustrated herein are provided for a better understanding of the present invention and form one part of the present invention, and the exemplary embodiments of the present invention and the description thereof are illustrative of the present invention but are not to be construed as limiting the present invention.

DETAILED DESCRIPTION OF THE EMBODIMENTS

The present invention is described below in detail with reference to the accompanying drawings in conjunction with exemplary embodiments. It should be noted that the embodiments described herein and the features thereof can be combined with each other on condition that no conflict is caused.

A more secure OTA bootstrap method for managing a mobile terminal device is provided in an embodiment of the present invention to address the problem associated with the conventional OTA bootstrap that transmits a great amount of sensitive information over the air and runs a risk of receiving a malicious bootstrap message and is therefore not very secure.

Figure 2:
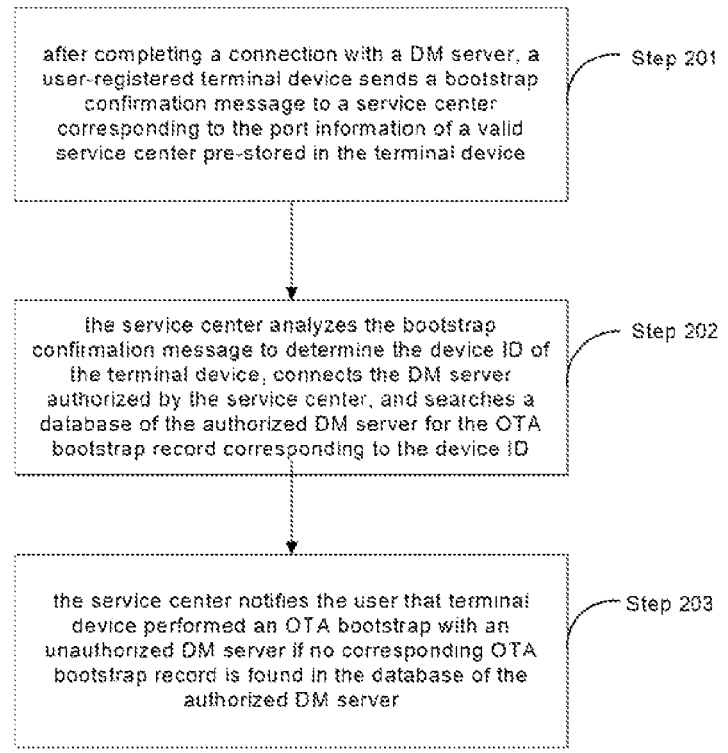
FIG. 2 is a schematic diagram illustrating the flow of the OTA bootstrap method provided herein.

In order to address the technical problem above, an OTA bootstrap method is provided in an embodiment of the present invention, which, as shown in FIG. 2, comprises:

Step 201: after completing a connection with a DM server, a user-registered terminal device sends a bootstrap confirmation message to a service center corresponding to the port information of a valid service center pre-stored in the terminal device;

Step 202: the service center analyzes the bootstrap confirmation message to determine a device ID of the terminal device, connects to a DM server authorized by the service center, and searches a database of the authorized DM server for an OTA bootstrap record corresponding to the device ID;

Step 203: the service center notifies the user that the terminal device performed an OTA bootstrap with an unauthorized DM server if no corresponding OTA bootstrap is found in the database of the authorized DM server.

In the flow chart shown in FIG. 2, after completing a connection, the terminal device sends a bootstrap confirmation message to a service center corresponding to the port information of a valid service center pre-stored in the terminal device, wherein the service center that receives the bootstrap confirmation message is a legitimate one that cannot be faked to intercept the bootstrap confirmation message. Subsequently, the service center can quickly detect an OTA bootstrap performed between the terminal device and an unauthorized DM server, thus preventing an authorized DM server from losing the control over the terminal device without realizing it. Therefore, the DM information in the terminal device is protected against being leaked or maliciously modified, which may cause the user a great loss.

Certainly, in addition to notifying that the terminal device performed an OTA bootstrap with an unauthorized DM server, the service center can also notify the authorized DM to perform a new OTA bootstrap for the terminal device, and accordingly, after being notified of the OTA bootstrap between the terminal device and the unauthorized DM server, the authorized DM server can perform a new OTA bootstrap for the terminal device to re-gain the control over the terminal device.

At implementation, since a DM server connected with the terminal device may be an unauthorized DM server or an authorized one, the following cases are possible: case 1: the terminal device is connected with an unauthorized DM server, as mentioned above, i.e., no corresponding OTA bootstrap record is found in the database of the authorized DM server; case 2: the terminal device is connected with an authorized DM server, i.e., a corresponding OTA bootstrap record is found in the database of the authorized DM server, in this case, if the bootstrap message body resulting from the service center's analysis of a bootstrap confirmation message is consistent with the corresponding OTA bootstrap record and the terminal device is successfully connected with the DM server, then the service center notifies the user of a successful OTA bootstrap, and if the bootstrap message body resulting from the service center's analysis of a bootstrap confirmation message is different from the corresponding OTA bootstrap record or the terminal device fails in connection with the DM server, then the service center notifies the user of a failed OTA bootstrap.

In the application of the OTA bootstrap method the following operation may be performed after the service center notifies the user of a failed OTA bootstrap: the DM server re-performs an OTA bootstrap for the terminal device after determining that the position information in the bootstrap confirmation message is wrong.

Figure 3:
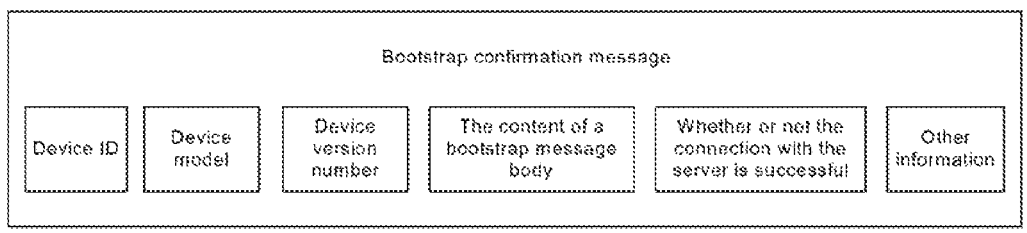
FIG. 3 is a schematic diagram illustrating the structure of the bootstrap confirmation message provided herein.

At implementation, the bootstrap confirmation message may contain a device ID, a device model, a device version number of the terminal device, a bootstrap message body and an identifier indicating whether the connection with the DM server succeeds or not. The structure of the bootstrap confirmation message is shown in FIG. 3. Certainly, in a specific application, the bootstrap confirmation message may contain other information such as the address from which the message is initiated. When compared with an OTA bootstrap record, the bootstrap message body may include the content of the bootstrap confirmation message free of MAC check information, or a combination of one or more of the following fields: an address of the DM server, a port number of the DM server, and a server ID of the DM server, or other contents that can be compared with the OTA bootstrap record. The key information of the bootstrap confirmation message is usually selected. In an application, one or more pieces of the key information rather than the entire key information are selected so as to reduce the amount of data of the bootstrap confirmation message.

Figure 1:
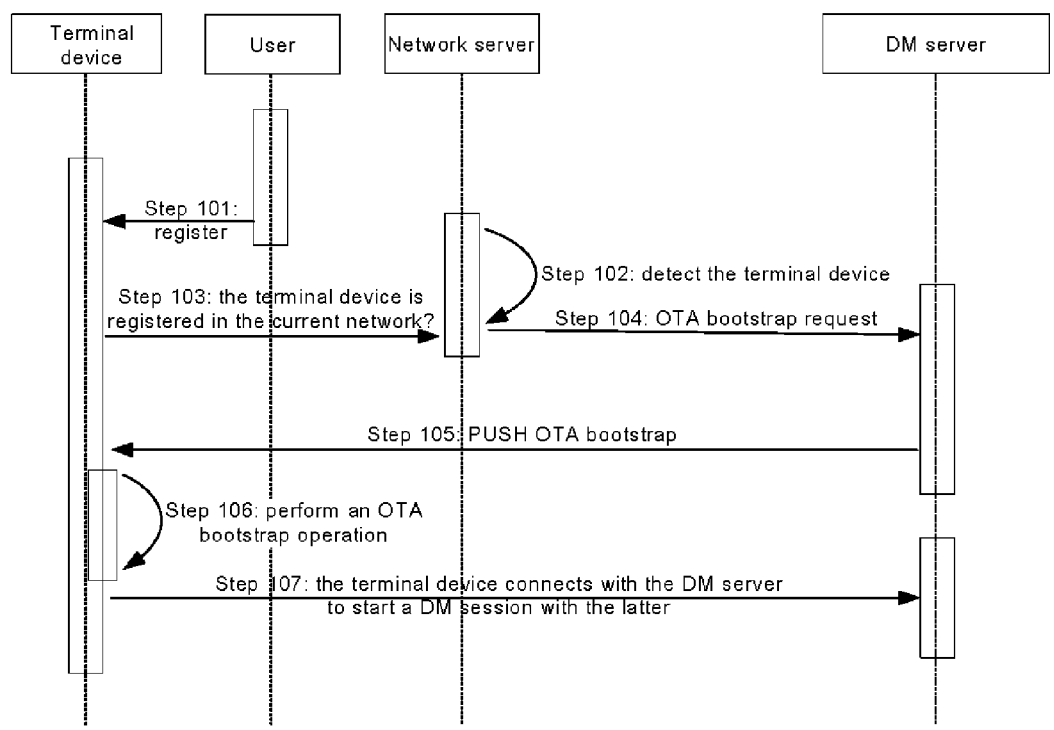
FIG. 1 is a schematic diagram illustrating the flow of an OTA bootstrap method used in a related art.
Figure 4:
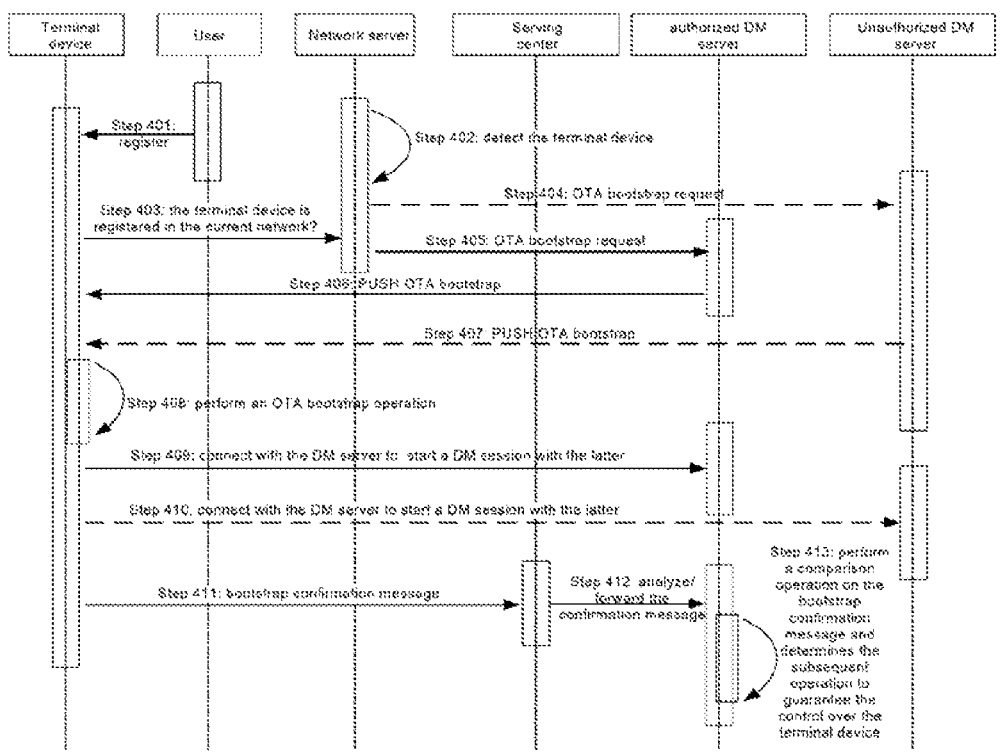
FIG. 4 is a flow chart of an example of the OTA bootstrap method provided herein.

In order to illustrate the technical scheme of the OTA bootstrap method provided here which is different from the conventional one shown in FIG. 1, an authorized DM server and an unauthorized DM server are distinguished in this embodiment, and the network environment in which the OTA bootstrap method is applied involves: a terminal device, a user, a network server, a service center, an authorized DM server and an unauthorized DM server, wherein the service center is a valid service center determined according to the port information of a valid service center pre-stored in a terminal device. As shown in FIG. 4, the specific processing flow of the OTA bootstrap method provided in this embodiment comprises:

Step 401: a user registers at a terminal device;

Step 402: a network server detects the terminal device in the same network;

Step 403: the terminal device confirms that it is registered with the current network;

Step 404: the network server sends an OTA bootstrap request to an unauthorized DM server;

Step 405: the network server sends an OTA bootstrap request to an authorized DM server;

Step 406: the authorized DM server returns a PUSH OTA bootstrap message;

Step 407: the unauthorized DM server returns a PUSH OTA bootstrap message;

Step 408: the terminal device performs an OTA bootstrap operation;

Step 409: the terminal device connects with the authorized DM server to start a DM session with the latter;

Step 410: the terminal device connects with the unauthorized DM server to start a DM session with the latter;

Step 411: the terminal device sends a bootstrap confirmation message to a service center;

Step 412: the service center analyzes the bootstrap confirmation message or forwards the bootstrap confirmation message to the authorized DM server;

Step 413: the authorized DM server performs a comparison operation on the bootstrap confirmation message and determines the subsequent operation to keep its control over the terminal device.

In FIG. 4, a solid line represents interactions with the authorized DM server, and a dotted line represents interactions with the unauthorized DM server.

In the application of the OTA bootstrap method, before Step 401 is executed, receiving port information of a valid service center has been pre-install in the terminal device and such information cannot be modified by a user to guarantee the legitimacy of the service center.

Certainly, different subsequent operations may be performed in Step 413 based on comparison results, specifically, for instance, if the result shows the bootstrap confirmation message is matched (that is, the contents are the same), and an OTA bootstrap is successful, then all the operations are normal, otherwise, there is something wrong with the OTA bootstrap just completed by the device, and appropriate operations must be performed. For instance, the authorized DM server must re-performed an OTA bootstrap operation and if the authorized DM server fails the OTA bootstrap operations for too many times, then a determination is made on whether or not to send a message to notify the user of the failed OTA bootstrap operations according to the result, and then the work flow is terminated.

The OTA bootstrap method mentioned in related art does not consider the effect of a malicious bootstrap message and is therefore incapable of guaranteeing the connection of a terminal device, after performing a wrong bootstrap, with an authorized server, and once being connected with an unauthorized DM server, the DM information in the device is likely to be leaked or modified maliciously, which may cause a great loss to the user and lead to a severe consequence.

Compared with the conventional art, the OTA bootstrap method provided herein, which takes full consideration of the feedback function of a server and sends a bootstrap confirmation message to a service center after an OTA bootstrap is performed by a terminal device, effectively eliminates the problem existing in the conventional art that a service center cannot be notified of the current situation of a terminal device after an OTA bootstrap operation is performed, guarantees a terminal device performing an unauthorized bootstrap can be timely detected, corrected and recovered in normal functions and be re-controlled by an authorized DM server, provides powerful support to the popularization and utilization of OTA bootstrap, and effectively avoids the risk caused by a malicious OTA bootstrap, therefore, by making a DM device always in the control of an authorized device, the OTA bootstrap method provided herein improves the security of OTA bootstrap and becomes a great improvement of existing OTA bootstrap method.

Figure 5:
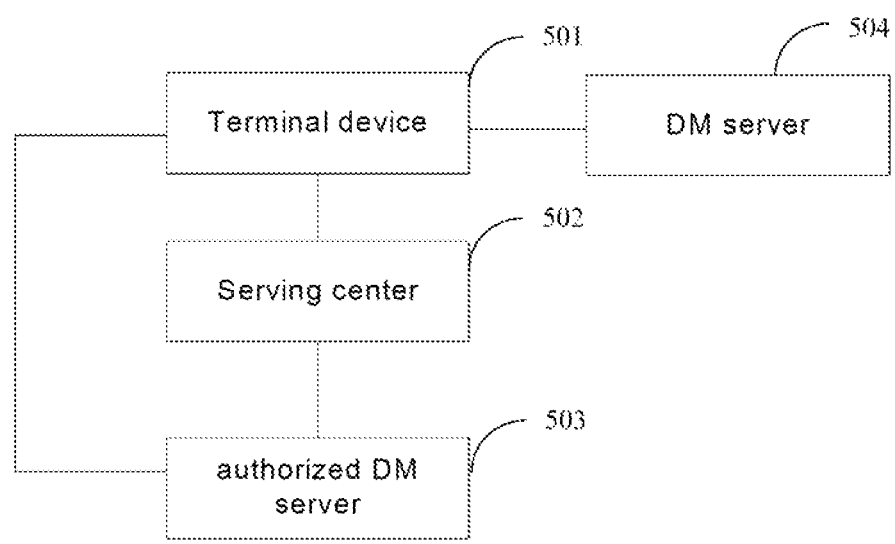
FIG. 5 is a schematic diagram illustrating the structure of the OTA bootstrap system provided herein.

In order to address the technical problem above, in an embodiment of the present invention, there is also provided an OTA bootstrap system, which, as shown in FIG. 5, comprises, a terminal device 501, a service center 502 corresponding to the port information of a valid service center pre-stored in the terminal device 501, a DM server 503 authorized by the service center 502 and a DM server 504 connected with the terminal device 501.

The terminal device 501 is configured to receive a registration of a user and send a bootstrap confirmation message to the service center 502 after completing a connection with the DM server 504.

The service center 502 is configured to analyze the bootstrap confirmation message to determine a device ID of the terminal device 501, connect to the authorized DM server 503, search a database of the authorized DM server 503 for an OTA bootstrap record corresponding to the device ID, and notify the user that the terminal device 501 performed an OTA bootstrap with an unauthorized DM server if no corresponding OTA bootstrap is found in the database.

The DM server 504 is configured to connect with the terminal device 501.

In an embodiment, when a corresponding OTA bootstrap record is found in the database of the authorized DM server 503, the service center 502 is also configured to notify the user of a successful OTA bootstrap if the bootstrap message body resulting from the service center 502's analysis of a bootstrap confirmation message is consistent with the corresponding OTA bootstrap record and the terminal device 501 succeeds in connecting with the DM server 504, the service center 502 is configured to notify the user of a failed OTA bootstrap if either the bootstrap message body is not consistent with the corresponding OTA bootstrap record or the terminal device 501 fails in connecting with the DM serve 504.

In an embodiment, the DM server 504 is also configured to re-perform an OTA bootstrap to the terminal device 501 after determining that position information in the bootstrap confirmation message is wrong after the service center 502 notifies the user of a failed OTA bootstrap.

In an embodiment, the service center 502 is also configured to notify the authorized DM server 503 to re-perform an OTA bootstrap for the terminal device 501 after notifying the user of an OTA bootstrap performed between the terminal device 501 and an unauthorized DM server.

The authorized DM server 501 is also configured to receive a notification from the service center 502 and perform an OTA bootstrap for the terminal device 501.

In accordance with the embodiment above, after completing a connection with a DM server, a user-registered terminal device sends a bootstrap confirmation message to a service center corresponding to port information of a valid service center pre-stored in the terminal device. The service center analyzes the bootstrap confirmation message to determine a device ID of the terminal device, connects to a DM server authorized by the service center, and searches a database of the authorized DM server for an OTA bootstrap record corresponding to the device ID, and notifies the user that the terminal device performed an OTA bootstrap with an unauthorized DM server if no corresponding OTA bootstrap is found in the database. By using the method provided herein, an OTA bootstrap performed between a terminal device and an unauthorized DM server can be found timely after a connection is completed, the problem is solved that existing OTA bootstrap takes a risk of receiving malicious bootstrap messages and leaking DM management information to an unauthorized DM server and is therefore not very secure, thus, the user is protected against a great loss as an authorized DM server is prevented from unconsciously losing the control over a terminal device, and the security of OTA bootstrap is improved.

Apparently, it should be appreciated by those skilled in the art that the modules or steps described herein can be realized by a universal computer, centralized on a single computer or distributed on a network consisting of multiple computers, and optionally realized by computer-executable program codes; the modules or steps can be therefore stored in a storage device to be executed by a computer in an order different from this illustrated herein or separately manufactured into integrated circuit modules, or some of the modules or steps are manufactured into a single integrated circuit module. Thus, the present invention is not limited to any special combination of hardware and software.

The mentioned above is only preferred embodiments of the present invention but not limitation to the present invention, various modification and variations can be devised by those skilled in the art, and it should be understood that any modification, equivalent and improvement devised without departing from the spirit and scope of the present invention fall within the protection scope of the present invention.

What is claimed is:

1. An over-the-air (OTA) bootstrap method, comprising:
    a user-registered terminal device connecting with a device management (DM) server;
    after completing the connection with the DM server, the user-registered terminal device sending a bootstrap confirmation message to a service center corresponding to port information of a valid service center pre-stored in the terminal device;
    the service center analyzing the bootstrap confirmation message to determine a device identification (ID) of the terminal device, connecting to an authorized DM server designated by the service center, and searching a database of the authorized DM server for an OTA bootstrap record corresponding to the device ID; and
    if no corresponding OTA bootstrap record is found in the database of the authorized DM server, the service center notifying the user that the terminal device performed an OTA bootstrap with an unauthorized DM server.

2. The method according to claim 1, further comprising:
    if a corresponding OTA bootstrap record is found in the database of the authorized DM server:
        the service center notifying the user of a successful OTA bootstrap if the bootstrap message body resulting from the service center's analysis of the bootstrap confirmation message is consistent with the corresponding OTA bootstrap record and the terminal device succeeds in connecting with the DM server; and
        the service center notifying the user of a failed OTA bootstrap if either the bootstrap message body is not consistent with the corresponding OTA bootstrap record or the terminal device fails in connecting with the DM server.

3. The method according to claim 2, further comprising, after the service center notifies the user of a failed OTA bootstrap:
    the DM server re-performing an OTA bootstrap to the terminal device after determining that position information in the bootstrap confirmation message is wrong.

4. The method according to claim 3, further comprising: after the service center notifies the user of an OTA bootstrap performed between the terminal device and an unauthorized DM server,
    the service center notifying the authorized DM server to re-perform an OTA bootstrap to the terminal device; and
    the authorized DM server receiving the notification from the service center and performing an OTA bootstrap to the terminal device.

5. The method according to claim 2, further comprising: after the service center notifies the user of an OTA bootstrap performed between the terminal device and an unauthorized DM server,
    the service center notifying the authorized DM server to re-perform an OTA bootstrap to the terminal device; and
    the authorized DM server receiving the notification from the service center and performing an OTA bootstrap to the terminal device.

6. The method according to claim 1, wherein the bootstrap confirmation message includes:
    a device ID, a device model, a device version number of the terminal device, a bootstrap message body, and an identifier indicating whether the connection with the DM server succeeds or not.

7. The method according to claim 6, wherein the bootstrap message body further includes content of the bootstrap confirmation message free of message authentication code (MAC) check information, or a combination of one or more of the following fields: an address of the DM server, a port number of the DM server, and a server ID of the DM server.

8. The method according to claim 7, further comprising: after the service center notifies the user of an OTA bootstrap performed between the terminal device and an unauthorized DM server, the service center notifying the authorized DM server to re-perform an OTA bootstrap to the terminal device; and the authorized DM server receiving the notification from the service center and performing an OTA bootstrap to the terminal device.

9. The method according to claim 6, further comprising: after the service center notifies the user of an OTA bootstrap performed between the terminal device and an unauthorized DM server, the service center notifying the authorized DM server to re-perform an OTA bootstrap to the terminal device; and the authorized DM server receiving the notification from the service center and performing an OTA bootstrap to the terminal device.

10. The method according to claim 1, further comprising: after the service center notifies the user of an OTA bootstrap performed between the terminal device and an unauthorized DM server, the service center notifying the authorized DM server to re-perform an OTA bootstrap to the terminal device; and the authorized DM server receiving the notification from the service center and performing an OTA bootstrap to the terminal device.

11. An over-the-air (OTA) bootstrap system, comprising a terminal device, a service center corresponding to port information of a valid service center pre-stored in the terminal device, an authorized device management (DM) server designated by the service center, and a DM server connected with the terminal device, wherein the terminal device is configured to receive registration of a user and send a bootstrap confirmation message to the service center after completing a connection with the DM server;

the service center is configured to analyze the bootstrap confirmation message to determine a device identification (ID) of the terminal device, connect to the authorized DM server, search a database of the authorized DM server for an OTA bootstrap record corresponding to the device ID, and notify the user that the terminal device performed an OTA bootstrap with an unauthorized DM server if no corresponding OTA bootstrap is found in the database;

the authorized DM server is configured to store an OTA bootstrap record.

12. The system according to claim 11, wherein, if a corresponding OTA bootstrap record is found in the database of the authorized DM server:

the service center is configured to notify the user of a successful OTA bootstrap if the bootstrap message body resulting from the service center's analysis of the bootstrap confirmation message is consistent with the corresponding OTA bootstrap record and the terminal device succeeds in connecting with the DM server; and the service center is configured to notify the user of a failed OTA bootstrap if either the bootstrap message body is not consistent with the corresponding OTA bootstrap record or the terminal device fails in connecting with the DM server.

13. The system according to claim 12, wherein, after the service center notifies the user of a failed OTA bootstrap, the DM server is also configured to re-perform an OTA bootstrap to the terminal device after determining that position information in the bootstrap confirmation message is wrong.

14. The system according to claim 13, wherein after the service center notifies the user of an OTA bootstrap performed between the terminal device and an unauthorized DM server, the service center is also configured to notify the authorized DM server to re-perform an OTA bootstrap to the terminal device; and the authorized DM server is also configured to receive the notification from the service center and performing an OTA bootstrap to the terminal device.

15. The system according to claim 12, wherein after the service center notifies the user of an OTA bootstrap performed between the terminal device and an unauthorized DM server, the service center is also configured to notify the authorized DM server to re-perform an OTA bootstrap to the terminal device; and the authorized DM server is also configured to receive the notification from the service center and performing an OTA bootstrap to the terminal device.

16. The system according to claim 11, wherein after the service center notifies the user of an OTA bootstrap performed between the terminal device and an unauthorized DM server, the service center is also configured to notify the authorized DM server to re-perform an OTA bootstrap to the terminal device; and the authorized DM server is also configured to receive the notification from the service center and performing an OTA bootstrap to the terminal device.

* * * * *